United States Patent [19]

Langford et al.

[11] Patent Number: 5,686,372

[45] Date of Patent: Nov. 11, 1997

[54] PHOTOCATALYST WITH MODIFIED ALKYL SILICATE ESTER SUPPORT AND PROCESS FOR PRODUCTION THEREOF

[75] Inventors: Cooper H. Langford, Alberta; Giuseppe P. Lepore; Lalchan Persaud, both of Ontario, all of Canada

[73] Assignee: University Technologies International Inc., Calgary, Canada

[21] Appl. No.: 451,650

[22] Filed: May 26, 1995

[51] Int. Cl.$^6$ .................... B01J 101/42; B01J 101/50
[52] U.S. Cl. ............................. 502/242; 502/254
[58] Field of Search ............................. 502/254, 242

[56] References Cited

U.S. PATENT DOCUMENTS

| | | | |
|---|---|---|---|
| 3,951,866 | 4/1976 | Goto | 252/461 |
| 4,495,041 | 1/1985 | Goldstein | 204/158 R |
| 4,547,557 | 10/1985 | McDaniel | 526/106 |
| 4,596,786 | 6/1986 | Kukes et al. | 502/242 |
| 4,751,005 | 6/1988 | Mitsui et al. | 210/759 |
| 4,806,514 | 2/1989 | Langford et al. | 502/159 |
| 4,861,484 | 8/1989 | Lichtin et al. | 210/638 |

FOREIGN PATENT DOCUMENTS

| | | |
|---|---|---|
| 0633064 | 1/1995 | European Pat. Off. . |
| 9419284 | 9/1994 | WIPO . |

*Primary Examiner*—Glenn A. Caldarola
*Assistant Examiner*—Nadine Preisch
*Attorney, Agent, or Firm*—Fitzpatrick, Cella, Harper & Scinto

[57] ABSTRACT

A photocatalyst compound comprising a silica-based support material having bound thereto a photocatalyst selected from the group consisting of $TiO_2$, $WO_3$ and mixtures thereof, the photocatalyst compound having been derivatized by reaction with an alcohol compound. The process for producing the photocatalyst compound comprises the steps of: (i) contacting a silica-based support material having bound thereto a photocatalyst selected from the group consisting of $TiO_2$, $WO_3$ and mixtures thereof with an alcohol compound to form a slurry; (ii) maintaining the temperature of the slurry above the boiling point of the slurry to produce a substance having a modified surface consisting essentially of an alkyl silicate ester and esterified photocatalyst; and (iii) subjecting the substance to selective oxidation to oxidize the esterfied photocatalyst thereby producing a photocatalyst compound having a modified surface consisting essentially of an alkyl silicate ester and a photocatalyst substantially free of ester groups. The photocatalyst compound is useful, inter alia, in the treatment of a fluid containing an organic pollutant.

23 Claims, 3 Drawing Sheets

PHOTOCATALYST WITH MODIFIED ALKYL SILICATE ESTER SUPPORT AND PROCESS FOR PRODUCTION THEREOF

BACKGROUND OF THE INVENTION

1. Field of the Invention

The present invention relates to a photocatalyst compound and to a process for production thereof.

2. Description of the Prior Art

There is a general consensus in the art that $TiO_2$, as a photocatalyst, is a superior material for the destruction of noxious contaminants contained in fluids such as water. Most investigations to date have used this material in the form of a slurry (~0.1%) in a small static reactor (less than a few liters). The slurry is exposed to electromagnetic radiation which results in catalytic destruction or decomposition of the pollutants in the fluid. For $TiO_2$, radiation having a wavelength of less than or equal to about 380 nm would result in catalytic destruction or decomposition of the pollutants in the fluid. The use of a slurry in this manner is problematic and can give rise to problems of separation when scaling up to an industrial level, i.e. where volumes greater than 100 liters are commonly needed.

In response to this, a number of authors have proposed immobilization of $TiO_2$ on a support material. Thus, it is known in the art to load $TiO_2$ on to a support to facilitate recovery of the $TiO_2$ in a specific place. However, as is known in the art, $TiO_2$ is a relatively poor adsorber of, inter alia, organic compounds and there has been little or no attention given to this in the art.

Indeed, much of the prior art has focused on methods of immobilizing the photocatalyst $TiO_2$ directly on to the support material. Generally, this technique involves thermal fusing of $TiO_2$ to a support material such as silica gel, etched glass beads, interior of glass tubes, Teflon™ tubing, woven glass mesh, sand and the like. See, for example, any of the following prior art references:

1. Serpone et al., *Solar Energy. Mater.* 14, 121 (1986),
2. Matthews et al., *Anal Chim. Acta.* 223, 171 (1990),
3. Matthews, *Solar Energy Mater.* 38, 405 (1987),
4. U.S. Pat. No. 5,182,030 (Crittenden et al.),
5. Australian patent application PH7074 (Mattews),
6. Stakheev et al., *J. Phys. Chem.* 97, 5668 (1993),
7. Matthews, *Wat. Res.* 25, 1169 (1991),
8. Yoneyana et al., *J. Phys. Chem.* 93 4833 (1989),
9. Yamanaka et al., *Mater. Chem. Phys.* 17, 87 (1987),
10. Minero et al., *Langmuir* 8, 481 (1992), and
11. U.S. Pat. No. 4,495,041 (Goldstein), the contents of each of which are hereby incorporated by reference. Unfortunately, most of these prior art systems are not superior photocatalysts compared to a slurry of $TiO_2$. Indeed, many of the prior art systems are typically inferior photocatalysts when used to treat aqueous fluids containing relatively common pollutants.

Thus, in summary, while there appears to exist a commercial interest in $TiO_2$-based photocatalysis for the destruction or decomposition of pollutants in water, the known systems suffer from a number of disadvantages.

Specifically, a disadvantage of the work done to date is that, with most of the supported $TiO_2$ photocatalysts, there is a drop-off in the photoactivity of the photocatalysts compared to the photoactivity of unsupported $TiO_2$ photocatalyst.

Yet another disadvantage is that, with most of the prior art supported $TiO_2$ photocatalysts, there is a drop-off in the adsorption of pollutants by the photocatalysts compared to the adsorption characteristics of the support material, per se, due to the unfavourable adsorption characteristics of $TiO_2$.

It would be desirable to have a photocatalyst compound alleviate at least one of the above-identified disadvantages of the prior art.

SUMMARY OF THE INVENTION

It is an object of the present invention to provide a novel photocatalyst compound which obviates or mitigates at least one of the above-mentioned disadvantages of the prior art.

It is another object of the present invention to provide a novel process for producing a photocatalyst compound.

Accordingly, in one of its aspects, the present invention provides a photocatalyst compound comprising a silica-based support material having bound thereto a photocatalyst selected from the group consisting of $TiO_2$, $WO_3$ and mixtures thereof, the photocatalyst compound having a modified surface consisting essentially of an alkyl silicate ester and a photocatalyst substantially free of ester groups.

In another of its aspects, the present invention provides a process for producing a photocatalyst compound comprising the steps of:

(i) contacting a silica-based support material having bound thereto a photocatalyst selected from the group consisting of $TiO_2$, $WO_3$ and mixtures thereof with an alcohol compound to form a slurry;

(ii) maintaining the temperature of the slurry above the boiling point of the slurry to produce a substance having a modified surface consisting essentially of an alkyl silicate ester and and esterified photocatalyst; and (iii) subjecting the substance to selective oxidation to oxidize the esterified photocatalyst thereby producing a photocatalyst compound having a modified surface consisting essentially of an alkyl silicate ester and a photocatalyst substantially free of ester groups.

Thus, the present inventors have discovered that it is possible to enhance the adsorption and/or photocatalytic activity of a silica-based support material loaded with a photocatalyst if the loaded support material is further treated with an alcohol and thereafter selectively oxidized to produce a photocatalyst compound. The present photocatalyst compound acts as a hydrophobic adsorbent rendering it ideal for use in aqueous fluids containing organic pollutants. Further the present photocatalyst compound is characterized by having a modified surface consisting essentially of: (i) an alkyl silicate ester, and (ii) a photocatalyst substantially free of ester groups. The principal advantage accruing from the present photocatalyst compounds is an improvement in the adsorption properties of the photocatalyst compound compared with conventional silica-based support materials which are unloaded or loaded with a photocatalyst.

As used throughout this specification the terms "ester", "esterification", "ester functionality" and "ester moiety", when used in the context of the present photocatalyst compound, are intended to encompass the product of a condensation reaction between inorganic acid and an alcohol with the concurrent loss of a stoichiometric mount of water. In the present photocatalyst compound, the inorganic acid is in the form of, for example, —Si(O)(OH)— in the silica-based support material and —Ti(O)(OH)— in the photocatalyst. When these moieties are reacted with an alcohol in accordance with the present process, a stoichiometric amount of water is eliminated and the alkyl group from the alcohol is bound to each moiety thereby creating an ester group. This will be discussed in more detail hereinbelow.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 1:
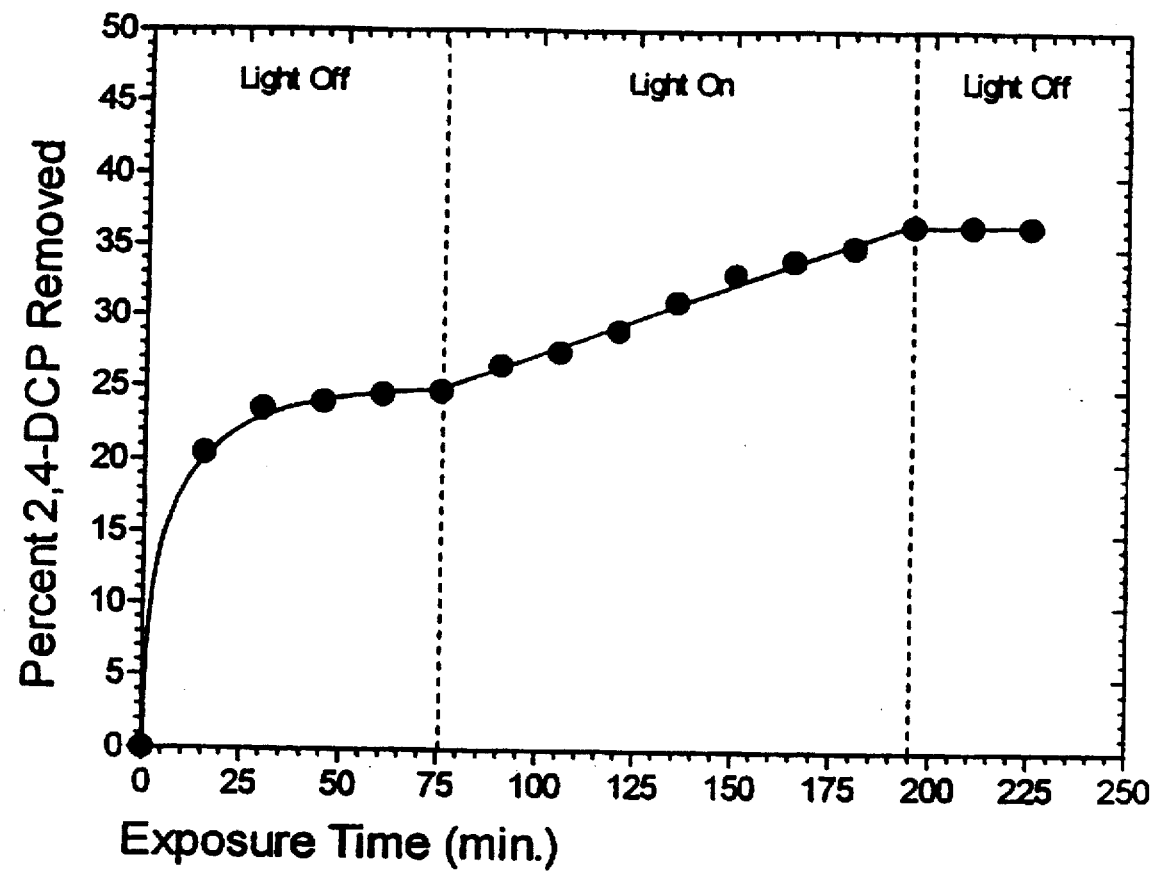
FIGS. 1–3 are graphs plotting percent 2,4-dichlorophenol removed versus time using photocatalyst compounds in accordance with the present invention.

Thus, an aspect of the present invention relates to a photocatalyst compound comprising a silica-based support material having bound thereto a photocatalyst selected from the group consisting of $TiO_2$, $WO_3$ and mixtures thereof, the photocatalyst compound having a modified surface consisting essentially of an alkyl silicate ester and a photocatalyst substantially free of ester groups.

Preferably, the photocatalyst is $TiO_2$. Preferably, at least a portion of the $TiO_2$ is present in a non-crystalline form. As is known in the art, $TiO_2$ can exist in the following crystalline forms: anatase, rutile and brookite, as well as in an amorphous (i.e. non-crystalline) form. In the context of the present invention, if the $TiO_2$ is in a crystalline form, it is preferred that the crystalline form be the anatase form.

Preferably, the $TiO_2$ is present in an amount of from about 0.5% to about 10%, more preferably from about 2% to about 8%, most preferably from about 2% to about 6% by weight of the photocatalyst compound. The precise amount of $TiO_2$ present in a given photocatalyst compound is best assessed by dissolution of the entire sample in a suitable acid and determination of Ti by well known techniques. In the case of insoluble supports the amount of $TiO_2$ can be approximated using conventional indirect techniques known to those of skill in the art.

The process for producing the photocatalyst compound comprises the steps of:

(i) contacting a silica-based support material having bound thereto a photocatalyst selected from the group consisting of $TiO_2$, $WO_3$ and mixtures thereof with an alcohol compound to form a slurry;

(ii) maintaining the temperature of the slurry above the boiling point of the slurry to produce a substance having a modified surface consisting essentially of an alkyl silicate ester and esterified photocatalyst; and (iii) subjecting the substance to selective oxidation to oxidize the esterified photocatalyst thereby producing a photocatalyst compound having a modified surface consisting essentially of an alkyl silicate ester and a photocatalyst substantially free of ester groups.

As used throughout the specification, the term "silica-based support material" is intended to have a broad meaning and encompasses materials such as silica gel, silica beads, high silicon aluminosilicates (i.e. aluminosilicates having an Si/Al ratio of at least 10/1), sol-gel matrices and the like. Preferably, the silica-based support material is a silica gel or a silica bead, more preferably a silica gel. As will be apparent to those of skill in the art, if the silica-based support material is a silica bead, the bead may be suitably pre-treated prior to loading of the $TiO_2$, $WO_3$ and mixtures thereof to enhance loading of the $TiO_2$ on to the bead.

The silica-based support material has bound thereto a photocatalyst selected from the group consisting of $TiO_2$, $WO_3$ and mixtures thereof. The manner by which this loading is accomplished is not particularly restricted.

Preferably, in the case of $TiO_2$, such a loaded silica-based support material may be obtained by a process comprising the steps of:

(i) hydrolysing a non-ionic titanium compound to produce a colloidal suspension having an average particle size of less than about 250 Å;

(ii) contacting a porous silica-based support material with the colloidal suspension to produce an impregnated support; and (iii) heating the impregnated support to bond $TiO_2$ to the silica-based support material.

Preferably, the colloidal suspension has an average particle size of from about 20 Å to about 100 Å, more preferably in the range of from about 20 Å to about 75 Å. This suspension may be considered as a sol. More information on the preparation of sols may be found in *J. Membrane Sci.*, 1988, 39, 243(Anderson et al.), the contents of which are hereby incorporated by reference.

In another preferred embodiment when the photocatalyst is $TiO_2$, the silica-based support material may be obtained by a process comprising the steps of:

(i) contacting a porous silica-based support material with a non-ionic titanium compound to produce a slurry;

(ii) hydrolysing the slurry to produce an impregnated support; and (iii) heating the impregnated support to bond $TiO_2$ to the silica-based support material.

In both of the preceding preferred embodiments for producing the silica-based support material, the impregnated support is heated to bond metal oxide and produce the silica-based support material. The conditions of heating are not particularly restricted and are generally within the purview of a person skilled in the art. Preferably, heating is conducted at a temperature in the range of from about 250° to about 500° C. for a period of from about 4 to about 24 hours, preferably from about 10 to about 14 hours, more preferably about 12 hours.

In either of the preceding preferred embodiments for producing the silica-based support material, it is preferred that the non-ionic titanium compound is selected from the group consisting of $TiCl_4$, $Ti(OR')_4$ and mixtures thereof, wherein R' is a $C_1-C_{10}$ alkyl group. The preferred group for R' is propyl.

In yet another preferred embodiment, the silica-based support material may be obtained by a process comprising the steps of:

(i) contacting a porous silica-based support material with a slurry of $TiO_2$ to produce an impregnated support; and (ii) heating the impregnated support to a temperature of at least about 150° C. to produce the silica-based support material.

The silica-based support material having bound thereto the photocatalyst (i.e. $TiO_2$, $WO_3$ or mixtures thereof) is contacted with an alcohol compound to form a slurry. Preferably, the alcohol compound has the formula

ROH wherein R is the member selected from the group consisting of a $C_1-C_{15}$ alkyl group, a $C_6-C_9$ aryl group and a $C_6-C_{15}$ alkylaryl group. Preferably, R is a $C_1-C_{15}$ alkyl group, more preferably a $C_4-C_{15}$ alkyl group. Most preferably R is selected from n-octyl and n-butyl, i.e. the alcohol is selected from n-octanol and n-butanol.

Preferably, the contacting is done with mixing such as mixing with an impeller or, more preferably, with ultrasonic mixing. While the duration of contact between the silica-based support material having bound thereto the photocatalyst and the alcohol is not particularly restricted, it is preferred that the duration of contact be at least about one hour.

During contact of the silica-based support material having bound thereto the photocatalyst and the alcohol, the temperature of the slurry is maintained above the boiling point of the slurry. In the case of n-octanol, a preferred alcohol, the temperature of the slurry should be at least 195° C., more preferably at least about 210° C., most preferably at least about 220° C.

The resulting substance can be removed from the slurry using conventional physical separation techniques such as gravity filtration, vacuum filtration and the like. Thereafter, the substance is subjected to selective oxidation to oxidize the esterified photocatalyst thereby producing a modified surface consisting essentially of an alkyl silicate ester and a non-esterified photocatalyst. Thus, the oxidation is selective in that only esterified photocatalyst is oxidized to produce $TiO_2$, $WO_3$, or mixtures thereof (i.e. non-esterified) while the alkyl silicate ester groups are unaffected.

A preferred form of selective oxidation is photolysis of a slurry of the substance in the present of a suitable oxidizing agent such as oxygen (e.g. neat or in the form of air). Preferably, photolysis is conducted at radiation wavelengths in the ultraviolet or near-ultraviolet regions. Practically, this includes conducted photolysis at wavelengths of less than about 380 nm. The period of photolysis is not particularly restricted. It has been found that a period of 3 to 4 hours is sufficient to oxidize substantially all of the ester groups on the photocatalyst while leaving the alkyl silicate ester groups unaffected.

While not wishing to be bound by any specific theory or mode of action, and for the purpose of illustration only, for the specific case shown, it is believed that a preferred embodiment of the present process proceeds in accordance with the following pathway:

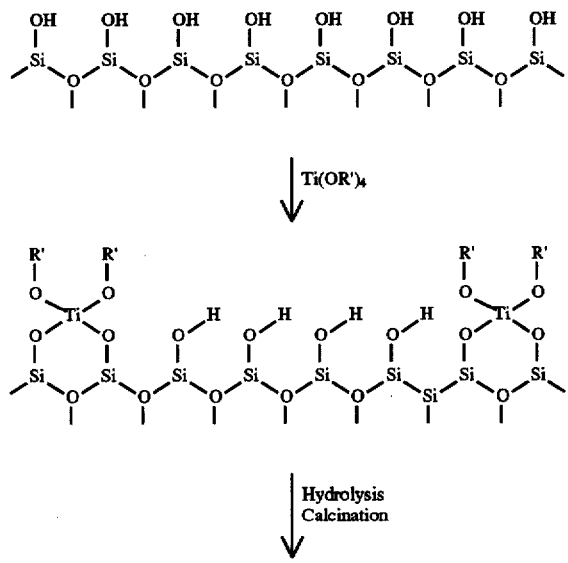

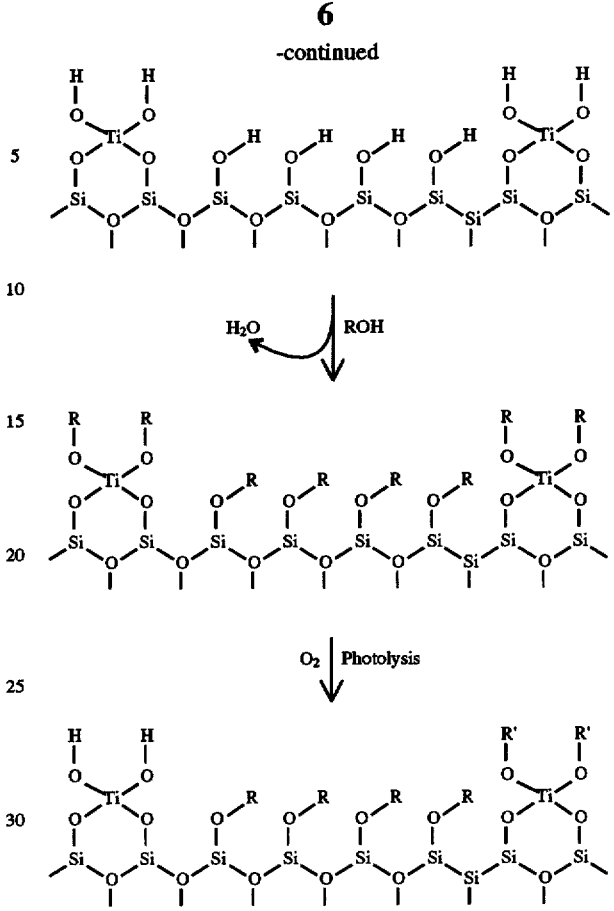

The present photocatalytic compound is hydrophobic in nature and is characterized by having a surface consisting essentially of: (i) an alkyl silicate ester, and (ii) a photocatalyst substantially free of ester groups. In the foregoing illustrative pathway R and R' are as defined above. The presence of the alkyl silicate esters can be confirmed by conducting a conventional carbon/hydrogen elemental analysis. The presence of photocatalyst substantially free of ester groups can be confirmed by assessing whether the product of the present process compound exhibits photocatalytic activity. Specifically, an esterified photocatalyst will be relatively non-photocatalytic.

When it is desired to produce a photocatalyst compound loaded with $WO_3$, it is preferred to contact the silica-based support material with a tungstate compound, preferably a metatungstate compound, more preferably ammonium metatungstate $((NH_4)_6H_2W_{12}O_{40})$. This results in impregnation of the support material, which can then be separated, dried, and heated as described above.

The present photocatalyst compound is useful in the treatment fluids containing, inter alia, organic pollutants. Generally, the photocatalyst compound can be used to catalyze photooxidation of the pollutants. This can be done by disposing the photocatalyst compound in the fluid to be treated and irradiating the fluid with radiation of a suitable wavelength. The treatment process can be continuous or batchwise. The design of a suitable fluid treatment system incorporating the present photocatalyst compound is within the purview of those of skill in the art.

Embodiments of the invention will be described with reference to the following Examples. It will be clearly understood that the Examples are illustrative in nature and should not be used to limit the scope of the present invention.

In the Examples, the following materials were used:

Acetone, spectroscopic grade, commercially available from ACP;

Ammonium thiocyanate, 99% pure, commercially available from Fischer;

2,4-Dichlorophenol, >99% pure, commercially available from Aldrich;

Hexane, spectroscopic grade, commercially available from Caledon;

Glass beads, 3–4 mm diameter, commercially available from Canlab;

Methanol, HPLC grade, commercially available from Canlab;

n-Octanol, 95% pure, commercially available from BDH;

Silica gel 100, 70–230 mesh, commercially available from EM Science;

Silica gel grade 58, 3–12 mesh, commercially available from Aldrich;

Titanium dioxide p-25, 75% anatase form, commercially available from Degussa Corporation;

Titanium (IV) isopropoxide, 97% pure, commercially available from Aldrich; and

Tri-n-octylphosphine oxide, commercially available from Terochem. Laboratories Ltd.

In the Examples, absorbance measurements for chemical actinometry experiments and semi-quantitative monitoring of photocatalytic reactions were effected using a Hewlett Packard UV-Vis diode array spectrophotometer (Model HP8452).

Substrate concentrations and product yields were monitored with a Varian 5000 Liquid Chromatograph instrument coupled with a UV-Vis variable/detector (set at 228 nm) and a 100 µL loop injector. The instrument was interfaced to a Varian CDS 401 data station (Vista Series). A Varian Micro-Pak MCH-10 reverse phase column (30 cm long×4 mm I.D.×0.25 in. O.D.) with 10 µm particle size was used. An isocratic elution was performed with a mobile phase mixture of 50% deionized distilled water, 35% methanol and 15% acetonitrile. Samples for this instrumental analysis were filtered through an HVLP 0.45 µm pore size Millipore filter.

Photoactivity of the photocatalysts was evaluated in two Photochemical Reactors. Photochemical Reactor 1 (hereinafter referred to as PR-1) was suited to evaluate powder samples having a particle diameter less than 1 min. Photochemical Reactor 2 (hereinafter referred to as PR-2) was constructed to evaluate materials having a particle diameter in the range of 2 to 8 mm to model dynamic flow through reactors.

PR-1 was a static, thermostated 100 mL cylindrical Pyrex™ cell equipped with a quartz glass window. The reactor was covered entirely with aluminum foil leaving an aperture of approximately 3 cm² exposed to radiation at the face of the quartz window. The light source was a PTI 200W xenon-mercury lamp powered by an LPS-250 PTI (Photon Technology International) power supply. A water filter was placed at the front of the reactor to remove the infrared radiation fraction emitted by the light source. The light intensity of the light incident inside the photoreactor geometry was measured with a potassium ferdoxalate actinometer using the protocol set out by Pitts et al., *Photochemistry*, John Wiley & Sons, Ltd., New York. pg. 783–785 (1966), the contents of which are hereby incorporated by reference.

PR-2 was a non-static, long Pyrex™ 22 cm×8 cm glass tube having a dead volume of 35 mL. The fluid being treated was continuously recirculated in the reactor zone from a 100 mL reservoir. The effluent was periodically monitored from a 1 cm flow cell set in a UV-Vis spectrophotometer. The absorption spectrum of the fluid being treated was scanned in the range of from 200 nm to 800 nm. Photolysis was carried out in a high intensity Rayonet™ photochemical reactor (The Southern New England Ultraviolet Co., Hamden, Conn.) equipped with eight 350 nm lamps.

EXAMPLE 1

Silica gel 100 was used in this Example. The silica gel had particle diameters ranging from 0.063 to 0.200 mm, a mean pore diameter of 100 Å, a specific surface area of 420 m²/g and a pore volume of 1.05 mL/g. The pH of a 10% aqueous suspension of the silica gel was determined to be 7.0–7.5. The silica gel was pre-treated with a warm solution (60° to 80° C.) of 0.1M HCl for 8 hours to remove any impurities. The pretreated silica gel was then washed several times with distilled water, filtered on Whatman hardened ashless 541 filter paper (for coarse and gelatinous precipitates) and thereafter dried in an oven overnight at 105° C.

10 g of pre-treated silica gel was transferred to a 400 mL beaker containing 250 mL hexane to form a slurry. The slurry was stirred and varying amounts of titanium (IV) isopropoxide added dropwise to the beaker. The resulting slurry was sonicated for 20 minutes and then stirred to facilitate evaporation of the hexane to produce a dry powder residue. The dry powder residue was left to stand adjacent a 50 mL beaker of water (to provide humidity) in a covered environment overnight to permit the residue to undergo slow hydrolysis.

Thereafter 375 mL of deionized distilled water was added to the dry powder along with 2.5 mL concentrated nitric acid. The resulting suspension was stirred at a temperature of 80° C. until most of the liquid had evaporated. The solid material remaining was dried in an oven at 105° C. and thereafter heated in a Pyrex™ tube furnace at 500° C. for 12 hours under a constant flow of humid air. The calcined material was: (i) washed with distilled water, and (ii) filtered on a Whatman 541 filter paper. Steps (i) and (ii) were repeated until the filtrate in step (ii) was clear.

The $TiO_2$ loading in the material was determined using a classical colorimetric method that was highly selective and sensitive to titanium—see J. P. Young et al., *Anal. Chem.*, 31, pgs. 393–397 (1959), the contents of which are hereby incorporated by reference. The method involved the dissolution of $TiO_2$ in acidic solution and the formation of an extractable titanium-thiocyanate complex which had a high molar extinction coefficient ($4.10\times10^4$ $M^{-1}cm^{-1}$) in the visible region (422 nm).

A standard curve of absorbance versus $TiO_2$ level was produced from analysis of a series of standard samples having a known $TiO_2$ loading. The standard curve was then used to assess the $TiO_2$ loading level in the material made in this Example. It was found that the $TiO_2$ loaded material had a $TiO_2$ loading level of 0.08% by weight of the sample.

A sample of the $TiO_2$ loaded material was heated to approximately 200° C. and then placed in a 50 mL Teflon™ tube containing n-octanol. The tube was then autoclaved at a temperature of approximately 215° C. (i.e. approximately 20° C. above the boiling point of n-octanol) for 12 hours. Thereafter, the solid was removed from the tube, and washed with hexane, acetone and then methanol. The solid was then photolyzed in methanol for 3 to 4 hours to oxidize any esters surface bound to the $TiO_2$.

EXAMPLE 2 (COMPARATIVE)

The procedure of Example 1 was repeated with the exception that the procedure ended with isolation of the TiO$_2$ loaded material. In other words, the material was not further reacted with n-octanol. As will be appreciated by those of skill in the art, the Example is for comparative purposes only as a non-ester standard.

EXAMPLE 3

Coarse silica gel 58 was washed several times with distilled water and dried at 200° C. The material had a specific surface area of 300 m$^2$/g, a mean pore diameter of 140 Å, a pore volume of 1.15 mL/g and a particle size in the range of from 4 to 8 mm.

The silica gel was placed in a flask and an excess amount of titanium (IV) isopropoxide was added to completely cover the silica gel in the flask. The flask was stoppered and the mixture was allowed to equilibrate for 24 hours. Thereafter, excess titanium (IV) isopropoxide was decanted and the solid material remaining was left to stand for seven days to allow slow hydrolysis thereof to occur. The solid material was immersed in distilled water to complete hydrolysis thereof.

The hydrolyzed material was then heated and reacted with n-octanol using the methodology described in Example 1.

EXAMPLE 4 (COMPARATIVE)

The procedure of Example 3 was repeated with the exception that the procedure ended with isolation of the TiO$_2$ loaded material. In other words, the heated material was not further reacted with n-octanol. As will be appreciated by those of skill in the art, the Example is for comparative purposes only, as a non-ester standard.

EXAMPLE 5

Commercially available TiO$_2$ (p25, Degussa) was loaded on to silica gel 100 which had been pretreated as described in Example 1. Loading was effected successively using a loading level of 3 wt/wt % TiO$_2$ to silica gel. Specifically, a TiO$_2$ aqueous slurry (pH~2.5) was initially sonicated for 20 minutes in a beaker. Thereafter, the silica gel was added to the beaker and the contents were sonicated for an additional 20 minute period. Most of the solvent was then evaporated by direct heating of the beaker and thereafter by placement in an oven maintained at 110° C. The dry powder was further heated at a temperature of 300° C. The dry powder was then was washed and filtered using the methodology described in Example 1. Using mass differential techniques, the final loading level of TiO$_2$ in the material was estimated to be 16.8% by weight. The TiO$_2$/silica gel solid was then reacted with n-octanol and subsequently irradiated using the procedure of Example 1.

EXAMPLE 6 (COMPARATIVE)

The procedure of Example 5 was repeated with the exception that the procedure ended with isolation of the TiO$_2$/silica gel solid. In other words, the TiO$_2$ loaded material was not further reacted with n-octanol. As will be appreciated by those of skill in the art, the Example is for comparative purposes only, as a non-ester standard.

EXAMPLE 7

The procedure of Example 5 was repeated except the silica gel used was silica gel 58. Prior to reaction with n-octanol, the TiO$_2$/silica gel solid was estimated to have a TiO$_2$ content of 0.12% by weight.

EXAMPLE 8 (COMPARATIVE)

The procedure of Example 7 was repeated with the exception that the procedure ended with isolation of the TiO$_2$/silica gel solid. In other words, the TiO$_2$/silica gel solid was not further reacted with n-octanol. As will be appreciated by those of skill in the art, this Example is for comparative purposes only, as a non-ester standard.

EXAMPLE 9

The procedure of Example 5 was repeated except, in place of silica gel, was used non-porous glass beads (3–4 mm in diameter) which were etched prior to use by immersion in a 1.4M NH$_4$.HF solution. Prior to reaction with n-octanol, the TiO$_2$/glass bead solid had TiO$_2$ content of 0.2% by weight.

EXAMPLE 10 (COMPARATIVE)

The procedure of Example 9 was repeated with the exception that the procedure ended with isolation of the TiO$_2$/glass bead solid. In other words, the TiO$_2$/glass bead solid was not further reacted with n-octanol. As will be appreciated by those of skill in the art, this Example is for comparative purposes only, as a non-ester standard.

EXAMPLE 11

The adsorption and photocatalytic activity properties of several of the photocatalyst materials prepared above were assessed with 2,4-dichlorophenol (2,4-DCP) as a model organic pollutant. This substrate was selected for its notoriety as an environmental pollutant that is resistant to biodegradation. PR-1 was used initially in this Example. The reactor was equipped with a lamp that emitted wavelengths greater than 320 nm with maximum emissions at 350 nm.

A 319.0 µM 2,4-DCP aqueous solution was prepared. The pH of the solution was 5.4. Direct photolysis showed negligible changes in concentration of 2,4-DCP after 5 hours, thus the lamps and the substrate were suitable for the photocatalysis investigation (i.e. 2,4-DCP did not degrade to any appreciable degree upon exposure to radiation only).

A slurry was prepared containing 0.300 g of the photocatalyst compound produced in Example 1 above and 100.0 mL of the 2,4-DCP aqueous solution. The slurry was placed in PR-1. The dark adsorption from the slurry was initially assessed for a period of 75 minutes. The results are provided in FIG. 1. As illustrated the equilibrium dark sorption of 2,4-DCP was approximately 23%. Thereafter, the irradiation lamp in PR-1 was turned on and the photoactivity of the slurry was assessed over a period of 125 minutes. Again, the results are provided in FIG. 1 and illustrate the removal of 2,4-DCP. Specifically, using photocatalyst compound of Example 1, it was possible to remove approximately 37% of the 2,4-DCP. From an industrial viewpoint, the relatively high adsorption and photocatalytic activity of this slurry would enable one to have the option to remove solid from the slurry after adsorption with a view to conducting photocatalysis in a different site. Thus, the material produced in Example 1 can be considered an adsorptive photocatalyst compound.

In contrast, with the photocatalyst compound produced in Example 2 (comparative) above, the dark adsorption of 2,4-DCP was less than 5%. This low adsorptivity necessitates use of the photocatalyst compound strictly as a photocatalyst and not as an adsorptive photocatalyst compound or a combined adsorbent/photocatalyst.

Figure 2:
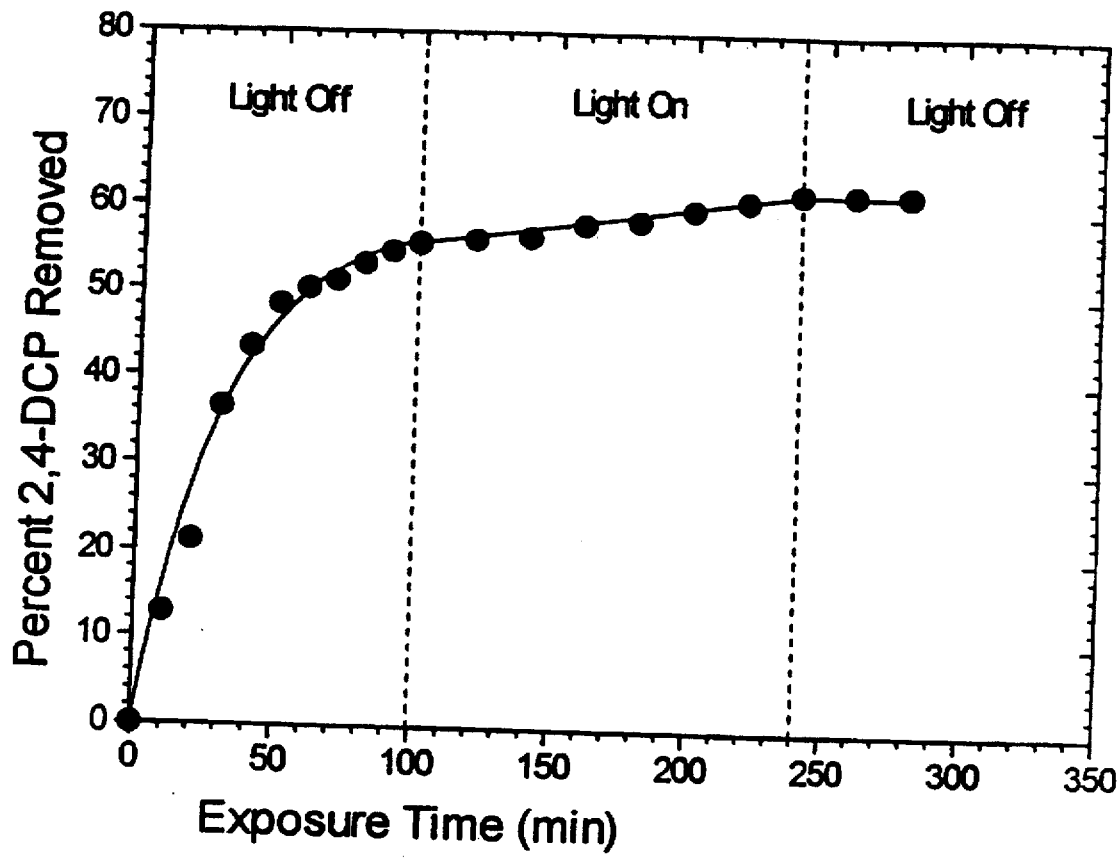

A 3.00 g sample of the photocatalyst compound produced in Example 3 above was used in the study of the adsorption and photocatalytic activity of the sample in a 2,4-DCP aqueous solution. The sample of photocatalyst compound was loaded into PR-2. The dark adsorption of the slurry was initially assessed for a period of 100 minutes. The results are provided in FIG. 2. As illustrated, the equilibrium dark sorption of 2,4-DCP was approximately 55%. Thereafter, the irradiation lamp in PR-2 was turned on and the photoactivity of the sample was assessed over a period of 140 minutes. Again, the results are provided in FIG. 2 and illustrate enhanced removal of 2,4-DCP. Specifically, using the photocatalyst compound of Example 1, it was possible to remove approximately 62% of the 2,4-DCP. From an industrial viewpoint, the relatively high adsorption and photocatalytic activity of this slurry would enable one have the option to remove solid from the slurry after adsorption with a view to conducting photocatalysis in a different site. Thus, this material is similar to the one produced in Example 1 in that both materials can be considered an adsorptive photocatalyst compound.

In contrast, with the photocatalyst compound produced in Example 4 (comparative) above, dark adsorption of 2,4-DCP was not readily observable (<5%). This low adsorptivity necessitates use of the photocatalyst compound strictly as a photocatalyst and not as an adsorptive photocatalyst compound or a combined adsorbent/photocatalyst.

Figure 3:
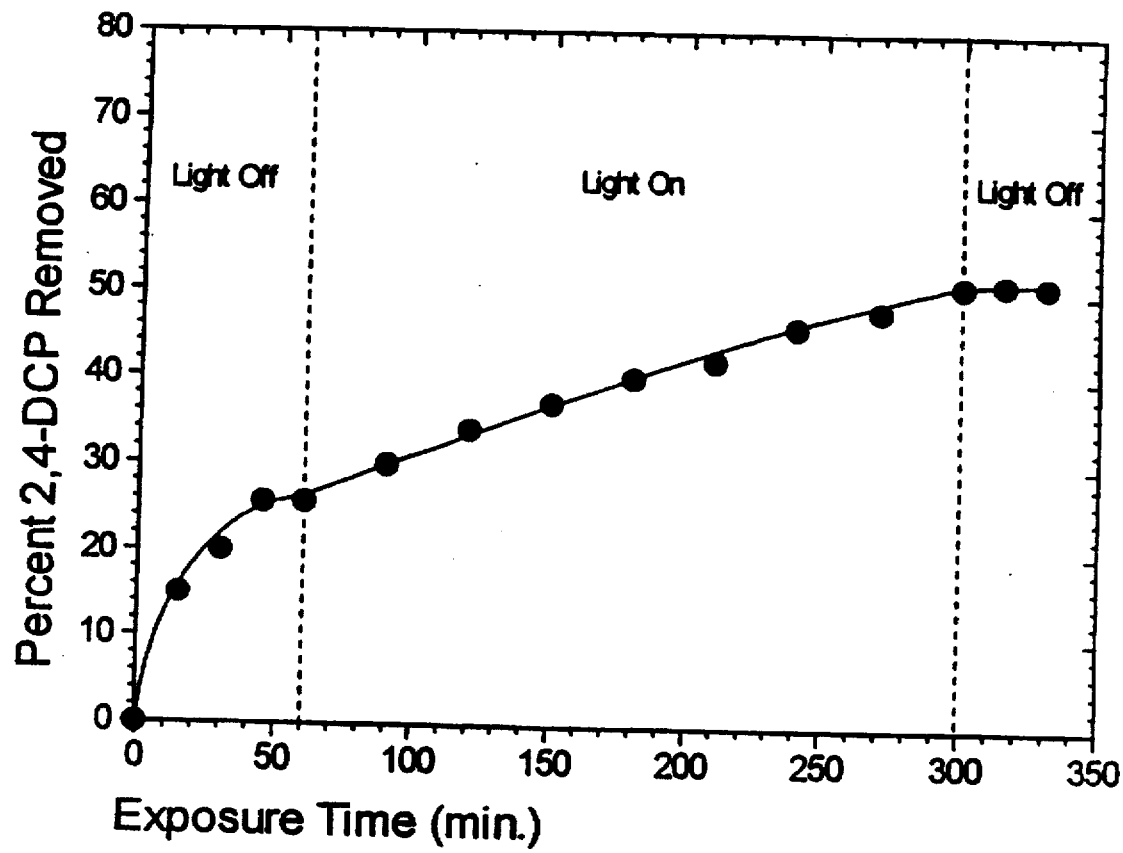

A slurry was prepared containing 0.300 g of the photocatalyst compound produced in Example 5 above and 100.0 mL of the 2,4-DCP aqueous solution. The slurry was placed in PR-1. The dark adsorption of the slurry was initially assessed for a period of 60 minutes. The results are provided in FIG. 3. As illustrated the equilibrium dark sorption of 2,4-DCP was approximately 26%. Thereafter, radiation lamp in PR-1 was turned on and the photoactivity of the slurry was assessed over a period of 240 minutes. Again, the results are provided in FIG. 3 and illustrate enhanced removal of 2,4-DCP. Specifically, using photocatalyst compound of Example 5, it was possible to remove approximately 52% of the 2,4-DCP. From an industrial viewpoint, the relatively high adsorption and photocatalytic activity of this slurry would enable one have the option to remove solid from the slurry after adsorption with a view to conducting photocatalysis in a different site. Thus, this material is similar to the one produced in Examples 1 and 3 in that both materials can be considered an adsorptive photocatalyst compound.

In contrast, with the photocatalyst compound produced in Example 6 (comparative) above, the dark adsorption of 2,4-DCP was not readily observable (<5%). This low adsorptivity necessitates use of the photocatalyst compound strictly as a photocatalyst and not as an adsorptive photocatalyst compound or a combined adsorbent/photocatalyst.

It should be understood that, while exemplary embodiments of the present invention have been described herein, the present invention is not limited to these exemplary embodiments, and that variations and other alternatives may readily occur to those of skill in the art without departing from the intended scope of the invention as defined by the attached claims.

What is claimed is:

1. A photocatalyst compound comprising: (i) a silica-based support material having a modified surface consisting essentially of an alkyl silicate ester; and (ii) a photocatalyst selected from the group consisting of $TiO_2$, $WO_3$ and mixtures thereof bound to the silica-based support material, the photocatalyst being substantially free of ester groups.

2. The photocatalyst compound defined in claim 1, wherein the photocatalyst is $TiO_2$.

3. The photocatalyst compound defined in claim 1, wherein the silica-based support material is porous.

4. The photocatalyst compound defined in claim 1, wherein the silica-based support material is a silica gel.

5. The photocatalyst compound defined in claim 1, wherein the silica-based support material is a silica bead.

6. The photocatalyst compound defined in claim 1, wherein the $TiO_2$ is present in an amount of from about 0.05% to about 10% by weight of the photocatalyst compound.

7. The photocatalyst compound defined in claim 1, wherein the $TiO_2$ is present in an amount of from about 2% to about 8% by weight of the photocatalyst compound.

8. The photocatalyst compound defined in claim 1, wherein the $TiO_2$ is present in an amount of from about 2% to about 6% by weight of the photocatalyst compound.

9. A process for producing a photocatalyst compound comprising the steps of:
(i) contacting a silica-based support material having bound thereto a photocatalyst selected from the group consisting of $TiO_2$, $WO_3$ and mixtures thereof with an alcohol to form a slurry;
(ii) maintaining the temperature of the slurry above the boiling point of the slurry to produce a substance having a modified surface consisting essentially of: an alkyl silicate ester and esterified photocatalyst; and
(iii) subjecting the substance to selective oxidation to oxidize the esterified photocatalyst, the alkyl silicate ester being substantially unaffected, thereby producing a photocatalyst compound having a modified surface consisting essentially of an alkyl silicate ester and a photocatalyst substantially free of ester groups.

10. The process defined in claim 9, wherein the photocatalyst is $TiO_2$.

11. The process defined in claim 9, wherein a portion of the $TiO_2$ is in a non-crystalline form.

12. The process defined in claim 9, wherein the alcohol has the formula

ROH wherein R is a member selected from the group consisting of a $C_1$–$C_{15}$ alkyl group, a $C_6$–$C_9$ aryl group and a $C_6$–$C_{15}$ alkylaryl group.

13. The process defined in claim 12, wherein R is a $C_1$–$C_{15}$ alkyl group.

14. The process defined in claim 12, wherein R is n-octyl.

15. The process defined in claim 12, wherein R is n-butyl.

16. The process defined in claim 9, wherein silica-based support material is obtained by a process comprising the steps of:
(i) hydrolysing a non-ionic titanium compound to produce a colloidal suspension having an average particle size of less than about 250 Å;
(ii) contacting a porous silica-based support material with the colloidal suspension to produce an impregnated support; and
(iii) calcining the impregnated support to produce the silica-based support material.

17. The process defined in claim 16, wherein the non-ionic titanium compound is selected from the group consisting of $TiCl_4$, $Ti(OR)_4$ and mixtures thereof, wherein R is a $C_1$–$C_{10}$ alkyl group.

18. The process defined in claim 9, wherein silica-based support material is obtained by a process comprising the steps of:
  (i) contacting a porous silica-based support material with a non-ionic titanium compound to produce a slurry;
  (ii) hydrolysing the slurry to produce an impregnated support; and
  (iii) calcining the impregnated support to produce the silica-based support material.

19. The process defined in claim 18, wherein the non-ionic titanium compound is selected from the group consisting of $TiCl_4$, $Ti(OR)_4$ and mixtures thereof, wherein R is a $C_1$–$C_{10}$ alkyl group.

20. The process defined in claim 9, wherein silica-based support material is obtained by a process comprising the steps of:
  (i) contacting a porous silica-based support material with a slurry of $TiO_2$ to produce an impregnated support; and
  (ii) heating the impregnated support to a temperature of at least about 150° C. to produce the silica-based support material.

21. The process defined in claim 9, wherein Step (iii) comprising subjecting the substance to photolysis in the presence of an oxidizing agent.

22. The process defined in claim 21, wherein photolysis is conducted using radiation having a wavelength less than about 380 nm.

23. The process defined in claim 21, wherein the oxidizing agent is selected from the group consisting of oxygen and air.

* * * * *